US012754053B2

(12) United States Patent
Schulz et al.

(10) Patent No.: US 12,754,053 B2
(45) Date of Patent: Oct. 6, 2026

(54) METHOD FOR DETERMINING A CUVETTE FORM CORRECTION VALUE

(71) Applicant: HACH LANGE GMBH, Berlin (DE)

(72) Inventors: Carsten Schulz, Berlin (DE); Clemens Hanschke, Berlin (DE); Wayne Boris Perdue, Berlin (DE)

(73) Assignee: HACH LANGE GMBH, Berlin (DE)

( * ) Notice: Subject to any disclaimer, the term of this patent is extended or adjusted under 35 U.S.C. 154(b) by 286 days.

(21) Appl. No.: 18/711,259

(22) PCT Filed: Nov. 14, 2022

(86) PCT No.: PCT/EP2022/081755

§ 371 (c)(1), (2) Date: May 17, 2024

(87) PCT Pub. No.: WO2023/088835

PCT Pub. Date: May 25, 2023

(65) Prior Publication Data

US 2025/0012613 A1 Jan. 9, 2025

(30) Foreign Application Priority Data

Nov. 18, 2021 (DE) ..................... 10 2021 130 133.5

(51) Int. Cl.

*G01F 22/00* (2006.01)
*G01B 13/10* (2006.01)
*G01N 21/03* (2006.01)

(52) U.S. Cl.

CPC ............. *G01F 22/00* (2013.01); *G01B 13/10* (2013.01); *G01N 21/03* (2013.01)

(58) Field of Classification Search

CPC ...... G01F 22/00; G01F 23/20; G01F 25/0084; G01N 21/03; G01B 13/10

(Continued)

(56) References Cited

U.S. PATENT DOCUMENTS 4,197,273 A * 4/1980 Dusserre ................. B29C 55/30 73/437
5,568,262 A * 10/1996 LaChapelle ........... G01F 23/292 356/627

(Continued)

FOREIGN PATENT DOCUMENTS

CA 2823661 A1 7/2012
CN 118076896 A * 5/2024 ....... G01N 35/00732

OTHER PUBLICATIONS

European Patent Office, International Search Report and Written Opinion, Feb. 6, 2023, 7 pages.

*Primary Examiner* — John Fitzgerald

(74) *Attorney, Agent, or Firm* — Ference & Associates LLC

(57) ABSTRACT

The invention relates to a method for determining a cuvette form correction value for a laboratory analysis cuvette filled with a liquid reagent and having a transparent cuvette body including a vertical wall and a bottom wall, including the method steps: determining the liquid reagent volume of the liquid reagent filled into the laboratory analysis cuvette, optically determining the liquid reagent level of the liquid reagent in the laboratory analysis cuvette by a level determination camera, calculating a horizontal inner width of the laboratory analysis cuvette from the determined liquid reagent volume and the determined liquid reagent level by an electronic control, and calculation of the form correction value from the calculated horizontal inner width and a reference inner width of the laboratory analysis cuvette by the electronic control.

8 Claims, 3 Drawing Sheets

(58) Field of Classification Search
USPC ............................................ 73/296; 356/246
See application file for complete search history.

(56) References Cited

U.S. PATENT DOCUMENTS

| | | | | |
|---|---|---|---|---|
| 6,741,365 | B2 | 5/2004 | Curtis | |
| 7,270,013 | B2 * | 9/2007 | Bhullar | G01F 25/0092 702/100 |
| 9,494,417 | B2 * | 11/2016 | Stefan | G01N 21/274 |
| 10,024,803 | B2 * | 7/2018 | Lenhard | B01L 3/5453 |
| 12,461,119 | B2 * | 11/2025 | Ewoniuk | G01N 35/00722 |
| 2008/0268486 | A1 | 10/2008 | Braig et al. | |
| 2012/0244628 | A1 * | 9/2012 | Rueeck | B01L 3/5453 436/164 |
| 2024/0408604 | A1 * | 12/2024 | Golitz | G01N 35/00732 |

* cited by examiner

METHOD FOR DETERMINING A CUVETTE FORM CORRECTION VALUE

The present application is a National Phase Entry of PCT International Application No. PCT/EP2022/081755, which was filed on Nov. 14, 2022, the contents of which are hereby incorporated by reference, which claims priority to DE Application No. 102021130133.5 filed Nov. 18, 2021, the contents of which are hereby incorporated by reference.

BACKGROUND

The invention refers to a method for determining a cuvette form correction value for a laboratory analysis cuvette filled with a liquid reagent, which comprises a cuvette body with a transparent vertical wall.

In the field of laboratory analysis, so-called cuvette tests have become established, for which laboratory analysis cuvettes pre-filled with a liquid reagent are used, which are inserted into a laboratory analyser unit after filling or pipetting a defined volume of a liquid sample for the quantitative analysis of an analyte or a chemical parameter of the liquid sample. The liquid reagent already filled into the cuvette by the manufacturer reacts with the analyte of the liquid sample, for example a waste water sample from a treatment process, by changing colour. This colour change is quantitatively determined in the laboratory analyser unit using a photometer. In this process, the upright standing cuvette is photometrically analysed in a horizontal direction, whereby the measured transmission or absorption is substantially proportional to the concentration of the analyte in question or to the intensity of the parameter in question.

Systematic errors in the evaluation of the photometry result on the one hand from so-called dilution errors and on the other hand from measurement section errors. A measurement section error results from the fact that the horizontal inner width of the transparent cuvette body, which defines the length of the measurement section, varies due to production, even within one production batch and from cuvette to cuvette. These variations are typically in the single-digit percentage range. In the case of cylindrical cuvettes, for example, cuvettes with diameters that deviate significantly from the nominal value can be sorted out. However, for an economical cuvette production, a variation of the diameter of up to 2% must be accepted. This also varies the horizontal inner width of the cuvette, which defines the photometric measuring section. The length of the photometric measuring section in turn directly affects the photometrically measured optical absorption or transmission. The smaller the allowed variations in the horizontal inner width of the cuvette, the greater the production waste and the resulting production costs for sufficiently accurately manufactured cuvettes.

A method for determining a cuvette form correction value is known from EP 2 472 219 A1, in which the inner diameter, corresponding to the photometric measuring distance, of a cross-sectionally circular cuvette body is determined photographically by means of a camera, the camera looking into the interior of the cuvette from above through the cuvette opening. A form correction value is determined by comparison with a nominal inner diameter, which is stored at a two-dimensional barcode attached to the outside of the cuvette body. The laboratory analyser unit reads the form correction value stored in the barcode of the cuvette inserted in the analyser unit with by means of a corresponding reading device and corrects the photometric measurement result determined by an analyser unit photometer accordingly. In this way, the photometric measurement error can be minimised.

The photographic determination of the cuvette inner diameter by a camera directed through the cuvette opening into the cuvette interior is technically challenging, and is possible only if the cuvette opening is not smaller than the cuvette inner diameter to be determined.

In contrast, the object of the invention is to provide a simple method for determining a cuvette form correction value for a laboratory analysis cuvette filled with a liquid reagent.

BRIEF SUMMARY

This object is solved according to the present invention with a method for determining a cuvette form correction value with the features described herein.

The method according to the present invention for determining a cuvette form correction value for a laboratory analysis cuvette filled with a liquid reagent is provided by an indirect measurement of the interior of the cuvette. This no longer requires a camera that is directed through the cuvette opening into the interior of the cuvette.

The laboratory analysis cuvette is defined by a transparent cuvette body which comprises a horizontal bottom wall and a lateral vertical wall. In principle, the vertical wall can comprise any shape suitable for horizontal photometry, for example, it can be quadratic in cross-section. More preferably, however, the cuvette vertical wall is configured to be circular cylindrical.

For the determination of the form correction value according to the present invention, the cuvette is already filled with the liquid reagent. First, the liquid reagent volume of the liquid reagent already filled into the laboratory analysis cuvette is obtained. The information about the exact volume of liquid reagent filled in can be transmitted by the filling system that previously filled the liquid reagent into the laboratory analysis cuvette. A typical laboratory analysis cuvette comprises an internal volume in the order of 10 ml. The volume of the liquid reagent in the laboratory analysis cuvette is typically between 200 μl and up to 5 ml.

The liquid reagent level of the liquid reagent in the laboratory analysis cuvette is determined optically by a level determination camera. The camera looks at the vertical wall of the cuvette from the outside in a horizontal direction. It therefore does not matter whether the cuvette opening is smaller than the cuvette interior in plan view or whether the cuvette opening is already closed by a lid. The camera can basically be a vertical line camera, but can also be a 2-dimensional area camera. The camera is used to determine the level of the liquid reagent volume in the interior of the laboratory analysis cuvette.

From the determined liquid reagent level and the known volume of the filled-in liquid reagent, the actual horizontal inner width of the laboratory analysis cuvette can then be calculated by a suitable electronic device or control. The horizontal inner width corresponds to the length of the optical measuring path in the cuvette during photometry. In the case of a cuvette body that is square in plan view, it is assumed that both inner widths crossing at right angles are approximately identical. By comparing the actual horizontal inner width of the cuvette determined in this way with an ideal reference inner width, the electronic control system finally calculates a form correction value which can correspond in a first approximation to the quotient of the actual inner width and the reference inner width.

This form correction value can then be used to correct the absorption or transmission value determined by the photometer during the subsequent photometry of a water sample filled into the cuvette whose analyte to be determined has reacted with the liquid reagent. In this way, the true analyte concentration is determined much more accurately. Furthermore, in this way, the waste in the cuvette production can be considerably reduced, as the requirements for the dimensional accuracy of the cuvettes can be reduced. Hereby, the average production costs for the usable cuvettes can be significantly reduced.

Preferably, the type of liquid reagent is identified prior to calculating the horizontal internal width. Typical liquid reagents used for water analysis in laboratory analysis cuvettes are used, for example, to determine the concentration of ammonium or nitrate, or to determine the chemical oxygen demand. For the sake of simplicity, an analyte in the present case and in the following is understood to be any parameter typically to be determined in water analysis. Typical liquid reagents are, for example, phosphorus-sulphuric acids or chromium-sulphuric acids. The liquid reagents used in water analysis sometimes have very different absorption spectra, specific masses and different viscosities or surface tensions, which can have a significant effect on the present method.

Preferably, the liquid reagent volume is determined by a cuvette scale which determines the mass of the filled liquid reagent. Either the empty mass of the empty cuvette is known, or is determined exactly beforehand by the cuvette scale or by another scale. The difference between the empty mass of the cuvette and the weighed total mass of the cuvette plus the liquid reagent is the mass of the liquid reagent.

From the liquid reagent mass determined by the cuvette scale and the identified liquid reagent type, the filled liquid reagent volume subsequently can exactly be calculated. In this way, when the liquid reagent is filled by the filling system, an extremely precise control of the injected liquid reagent volume can even become unnecessary.

Preferably, the electronic control comprises a meniscus interpretation module and a meniscus library in which meniscus form values are stored for different liquid reagent types, respectively. The meniscus interpretation module or the electronic control evaluates the camera signal of the level determination camera using the meniscus form value assigned to the respective liquid reagent type.

The level determination camera sees the phase transition meniscus from the outside through the transparent vertical wall of the cuvette body, the meniscus being configured on the inside between the liquid surface and the vertical side wall. The radius and height of the meniscus are considerably dependent on the surface tension of the liquid reagent in question. Depending on its form, the meniscus, which is annular in the case of a cylindrical cuvette, may have a relevant intrinsic volume, especially if the total volume of the liquid reagent introduced is relatively small. With use of the liquid reagent type, the relevant meniscus form value is determined from the meniscus library, so that the true liquid reagent level or the liquid reagent volume and the horizontal inner width of the laboratory analysis cuvette calculated from this can be calculated much more accurately.

Preferably, once the form correction value has been calculated, it is stored at the laboratory analysis cuvette. More preferably, the form correction value is stored as an optically readable marking at the laboratory analysis cuvette. For example, the form correction value can be stored as a numerical value in a two-dimensional barcode that is fixed to the cuvette body so that it is visible from the outside. In this way, the form correction value is assigned to the cuvette in question without assignment errors and cannot be lost. The optically readable form correction value identification can be read by a corresponding one- or two-dimensional digital barcode reader of the analyser unit. For example, the barcode reader may be located in the analyser unit's cuvette compartment into which the cuvette is inserted for photometry.

Preferably, the liquid reagent reacts with the analyte of a liquid sample filled into the cuvette in a colour-changing manner. The photometer determining the concentration determines the transmission or absorption of the reacted liquid sample, so that finally, with the help of the form correction value, the concentration of the analyte in the liquid sample can be calculated with high accuracy and reliability.

BRIEF DESCRIPTION OF THE SEVERAL VIEWS OF THE DRAWINGS

In the following, an embodiment of the invention will be explained in more detail with reference to the drawings. They show.

DETAILED DESCRIPTION

Figure 1:
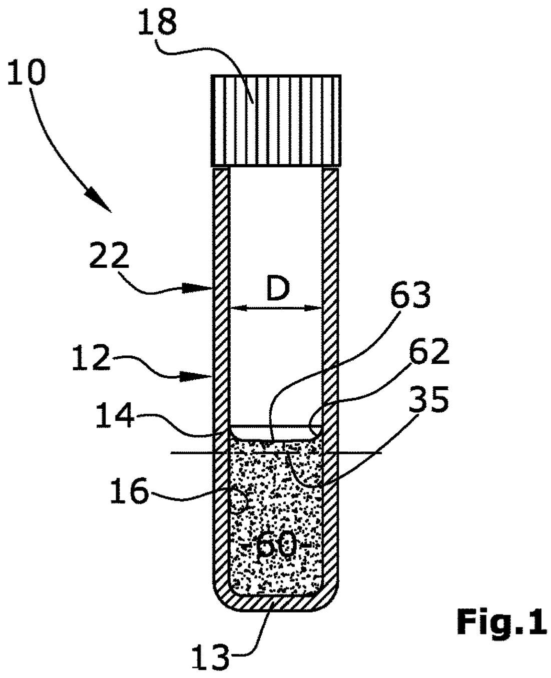
FIG. 1 a longitudinal section through a laboratory analysis cuvette.

FIG. 1 shows a cuvette 10 containing a liquid reagent 60, which cuvette 10 is closed by a lid-like transport cap 18. The cuvette 10 is defined by a beaker-shaped cuvette body 12 of transparent glass defining a horizontal bottom wall 13 and a circular cylindrical vertical wall 14. A two-dimensional barcode 22' is applied to the outside of the cuvette body 12 as an optically readable marking 22.

The total internal volume of the cuvette 10 is approximately 10 ml and the horizontal reference inner width D', which corresponds to the inner diameter on the inner side 16 of the vertical wall 14, is in the single-digit millimetre range, and is for example 4.0 mm. The actual horizontal inner width D can differ from the reference inner width D' due to the production process. The liquid reagent 60 may comprise a liquid reagent volume V of 200 μl to 5 ml, depending on the type of liquid reagent. Typical water analysis liquid reagents for the determination of ammonium concentration, nitrate concentration or chemical oxygen demand are phosphorus-sulphuric acids, chromium-sulphuric acids, etc.

Figure 2:
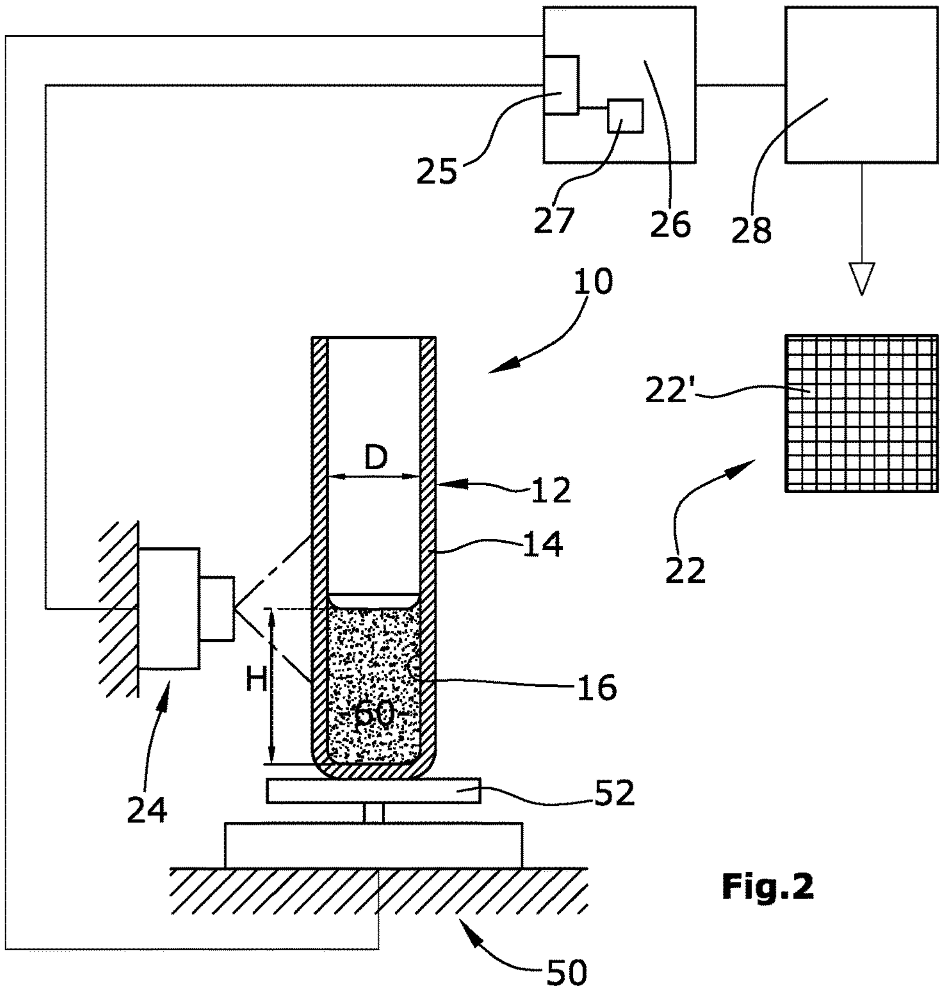
FIG. 2 an arrangement for determining the horizontal inner width of the cuvette body of the cuvette of FIG. 1, FIG. 3 an enlarged view of the level determination camera and the cuvette of the arrangement of FIG. 2, and FIG. 4 an analyser unit with an inserted cuvette.
Figure 3:
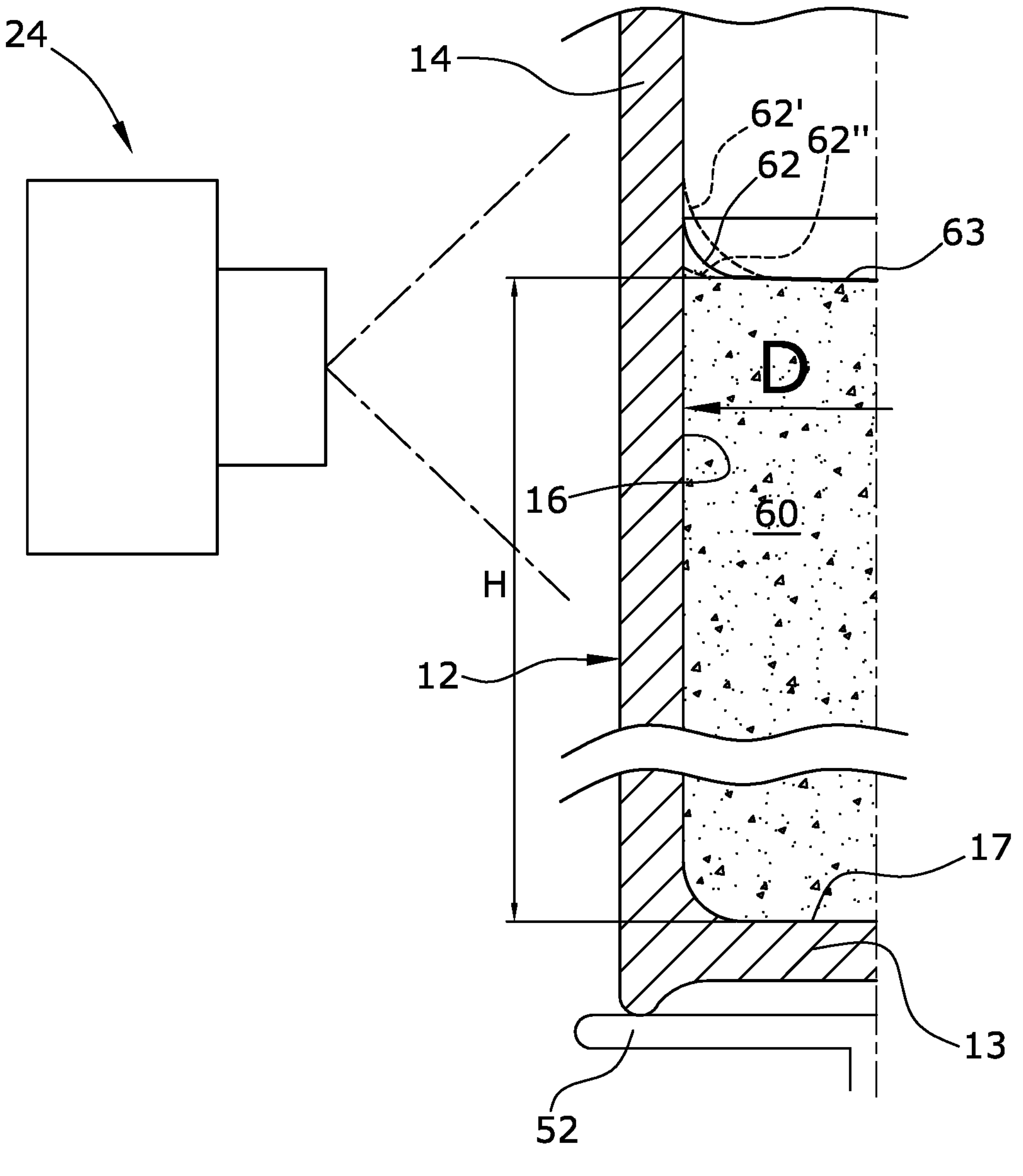

FIGS. 2 and 3 show an arrangement for the determination of a cuvette form correction value F. This arrangement comprises a level determination camera 24 which is directed laterally towards the cuvette 10 standing on a cuvette scale 50. The cuvette 10 is placed on a scale platform 52 of the cuvette scale 50. The arrangement comprises an electronic control 26 for determining the cuvette form correction value F. The controller 26 comprises a meniscus interpretation module 25 and a meniscus library 27 in which meniscus form values MF are stored for different liquid reagent types T, respectively. The meniscus form value MF comprises the extent to which the liquid reagent level H optically detected by the level determination camera 24 must be corrected in order to obtain a normalised level H of the liquid reagent 60 for the subsequent volume calculation.

Finally, the arrangement of FIG. 2 comprises a barcode printer 28 which prints an optically readable identification 22 in the form of a two-dimensional barcode 22' which is finally applied to the vertical wall 14 of the cuvette 10.

Figure 4:
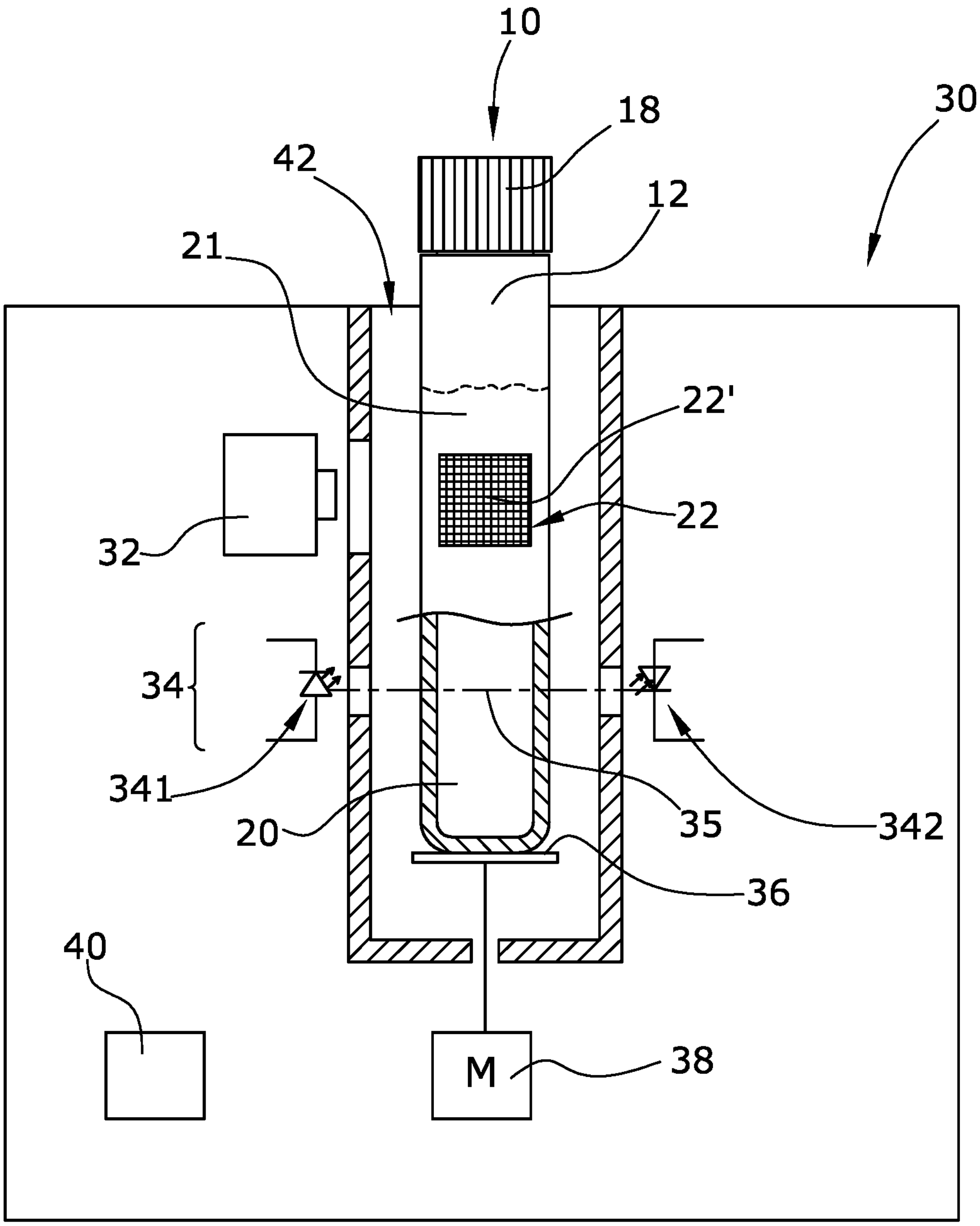

FIG. 4 shows a laboratory analyser unit 30 for the quantitative determination of an analyte or a parameter of a liquid sample using a so-called cuvette test.

The analyser unit 30 comprises a cuvette compartment 42 for positioning the cuvette 10. A turntable 36 is arranged at the bottom of the cuvette compartment 42, which can be rotated by an electric drive motor 38. Furthermore, the analyser unit 30 comprises a two-dimensional barcode reader 32 configured as a digital camera, which reads the barcode 22 as a photograph through a corresponding opening of the cuvette compartment wall. The analyser unit 30 comprises a photometer 34 defined by a photometer transmitter 341 and a photometer receiver 342. Finally, the analyser unit 30 comprises an electronic analyser unit controller 40.

After the laboratory analysis cuvette body 12 has been manufactured, it is filled in a filling unit with the predetermined target volume of a liquid reagent 60 of a specific liquid reagent type T, for example with a chromium-sulphuric acid for determining the chemical oxygen demand parameter. The reagent reacts with the analyte to be determined of the liquid sample filled later into the cuvette 10 to change its colour. During filling, the cuvette 10 may in general already be placed in the arrangement shown in FIGS. 2 and 3. The controller 26 receives the liquid reagent type T and the filled liquid reagent volume V from the filling system.

Alternatively, the controller 26 receives only the liquid reagent type T from the filling system, but not the filled liquid reagent volume V. Instead, the liquid reagent volume V is determined by means of the cuvette scale 50 by a differential measurement, i.e. a determination of the mass difference of an empty weighing and of a full weighing of the cuvette 60 without and with the liquid reagent 60. Since the liquid reagent type T and thus the specific weight of the liquid reagent 60 are known, the exact filled liquid reagent volume V can be calculated using the calculated mass M of the filled liquid reagent 60.

By means of the camera 24 and a corresponding image recognition, the control 26 determines the visible actual level H of the liquid reagent 60 in the laboratory analysis cuvette 10. The actual level H of the liquid reagent 60 visible through the camera 24 is defined by the cuvette central surface 63 of the liquid reagent 60. The controller 26 further determines from the meniscus library 27 the meniscus form value MF associated with the liquid reagent type T, with which the liquid reagent level H optically detected by the camera 24 is corrected accordingly, for example by addition. This is necessary because, depending on the surface tension of the liquid reagent 60 in question, the annular meniscus 62 may comprise a more or less relevant meniscus volume which, particularly in the case of a small total liquid reagent volume, may have a considerable influence on the accuracy of the following calculations.

In FIG. 3, a relatively small and less relevant possible meniscus 62" and a relatively large and, in the case of a relatively small liquid reagent volume, very relevant possible meniscus 62' are shown for supplementary and purely informative purposes. The meniscus volume may indeed amount to several percent of the liquid reagent volume V, and therefore could make a significant error in the following calculation of the form correction value F.

Based on the meniscus-corrected true liquid reagent level H and the filled liquid reagent volume V, the control 26 calculates the horizontal inner width D of the hollow cylindrical cuvette body 12. The horizontal inner width D corresponds exactly to the length of the measuring section 35 of the photometer 34 within the cuvette 10. The actual inner width D determined in this way is set in relation to a reference inner width D' stored for the cuvette 10, and a form correction value F is calculated from this ratio.

A barcode 22' is virtually generated from the form correction value F, which contains further information about the liquid reagent 60. The barcode 22' is printed on a label representing the optically readable identification 22 and is adhered to the outside of the cuvette body 12. Together with the transport cap 18, the cuvette 10 is then ready for shipping or for the analysis process.

For quantitative determination of an analyte, the transport cap 18 is removed, a defined volume of the liquid sample to be analysed, for example a wastewater sample from a treatment process, is pipetted into the cuvette, and the cuvette 10 is closed again with the transport cap 18. Then the liquid reagent 60 is mixed with the filled liquid sample by shaking, and the cuvette 10 is inserted into the cuvette compartment 42 of the analyser unit 30. After the reagent has reacted with the analyte to be determined in the liquid sample, the analysis process is started.

A turntable 36 is arranged at the bottom of the cuvette compartment 42, which can be rotated by the electric drive motor 38. The cuvette 10 is first rotated until the barcode reader 32, which is configured as a digital camera, has found the barcode 22 on the outside of the cuvette body 12. The barcode reader 32 then reads the barcode 22' so that the analyser unit control 40 derives from this, among other things, the form correction value F.

The photometer 34 photometrically determines the absorption or transmission in the measuring section 35. This is done while rotating the cuvette 10, for example, at ten different rotational positions, so that artefacts are statistically compensated or averaged if necessary and a reliable measured photometric value is available. In the analyser unit control 40, a true and more accurate measured value for the specific parameter is calculated from the measured photometric value, i.e. the absorbance or the transmission, by using the form correction value F, and is finally output visually, acoustically and/or electronically.

The invention claimed is:

1. A method for determining a cuvette form correction value for a laboratory analysis cuvette filled with a liquid reagent and having a transparent cuvette body comprising a vertical wall and a bottom wall, comprising the method steps:

- determining the liquid reagent volume of the liquid reagent filled into the laboratory analysis cuvette;
- optically determining the liquid reagent level of the liquid reagent in the laboratory analysis cuvette by a level determination camera;
- calculating a horizontal inner width of the laboratory analysis cuvette from the determined liquid reagent volume and the determined liquid reagent level by an electronic control; and
- calculating the form correction value from the calculated horizontal inner width and a reference inner width of the laboratory analysis cuvette by the electronic control.

2. The method for determining the cuvette form correction value according to claim 1, wherein the cuvette vertical wall is configured to be circular-cylindrically and the horizontal inner width is the inner diameter of the vertical wall.

3. The method for determining a cuvette form correction value according to claim 1, wherein the liquid reagent reacts in a colour-changing manner with the analyte depending on the analyte concentration of a liquid sample filled into the cuvette.

4. The method of determining the cuvette form correction value according to claim 1, comprising the step of: after calculating the form correction value: storing the form correction value at the laboratory analysis cuvette.

5. The method for determining the cuvette form correction value according to claim 4, wherein the form correction value is stored as an optically readable marking at the laboratory analysis cuvette.

6. The method for determining the cuvette form correction value according to claim 1, wherein the liquid reagent type is determined before the calculation of the horizontal inner width.

7. The method for determining the cuvette form correction value according to claim 6, wherein the determination of the liquid reagent volume is carried out by a cuvette scale which determines the mass of the filled liquid reagent and which is informationally connected to the electronic control.

8. The method for determining the cuvette form correction value according to claim 6, wherein the electronic control comprises a meniscus interpretation module and a meniscus library in which meniscus form values are respectively stored for different liquid reagent types, wherein the electronic control evaluates the camera signal on the basis of the meniscus form value assigned to the respective liquid reagent type.

* * * * *